(No Model.)  4 Sheets—Sheet 2.

J. M. BRIGGS & A. F. SCHWAHN.
SAUSAGE MEAT CUTTER.

No. 438,056.  Patented Oct. 7, 1890.

(No Model.) 4 Sheets—Sheet 3.

J. M. BRIGGS & A. F. SCHWAHN.
SAUSAGE MEAT CUTTER.

No. 438,056. Patented Oct. 7, 1890.

(No Model.) 4 Sheets—Sheet 4.
J. M. BRIGGS & A. F. SCHWAHN.
SAUSAGE MEAT CUTTER.
No. 438,056. Patented Oct. 7, 1890.
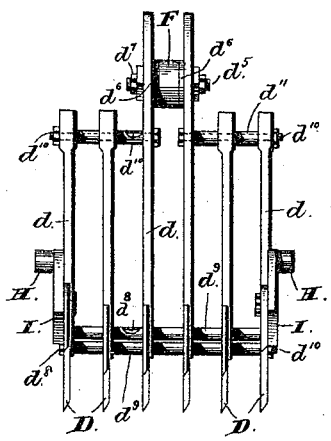
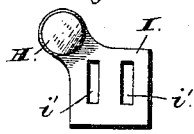
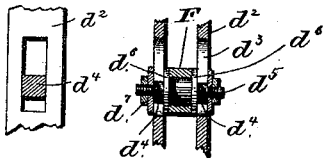
Witnesses:
Jas. E. Hutchinson
Henry C. Hazard
Inventors:
Joseph M. Briggs
Albert F. Schwahn
by Pindle & Russell
their attorneys

UNITED STATES PATENT OFFICE.

JOSEPH M. BRIGGS AND ALBERT F. SCHWAHN, OF EAU CLAIRE, WISCONSIN.

SAUSAGE-MEAT CUTTER.

SPECIFICATION forming part of Letters Patent No. 438,056, dated October 7, 1890.

Application filed May 1, 1890. Serial No. 350,189. (No model.)

*To all whom it may concern:*

Be it known that we, JOSEPH M. BRIGGS and ALBERT F. SCHWAHN, of Eau Claire, in the county of Eau Claire, and in the State of Wisconsin, have invented certain new and useful Improvements in Sausage-Meat Cutters; and we do hereby declare that the following is a full, clear, and exact description thereof, reference being had to the accompanying drawings, in which—

Figure 1:
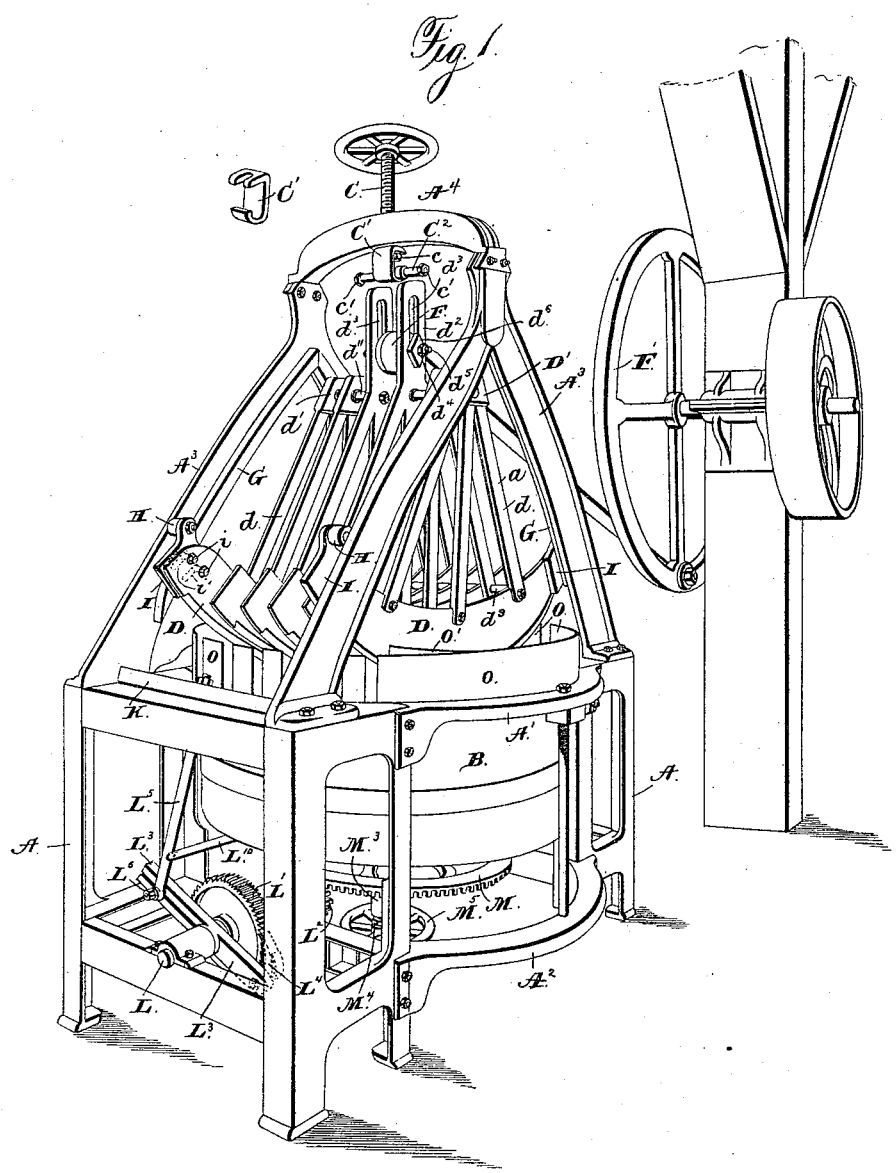
Figure 2:
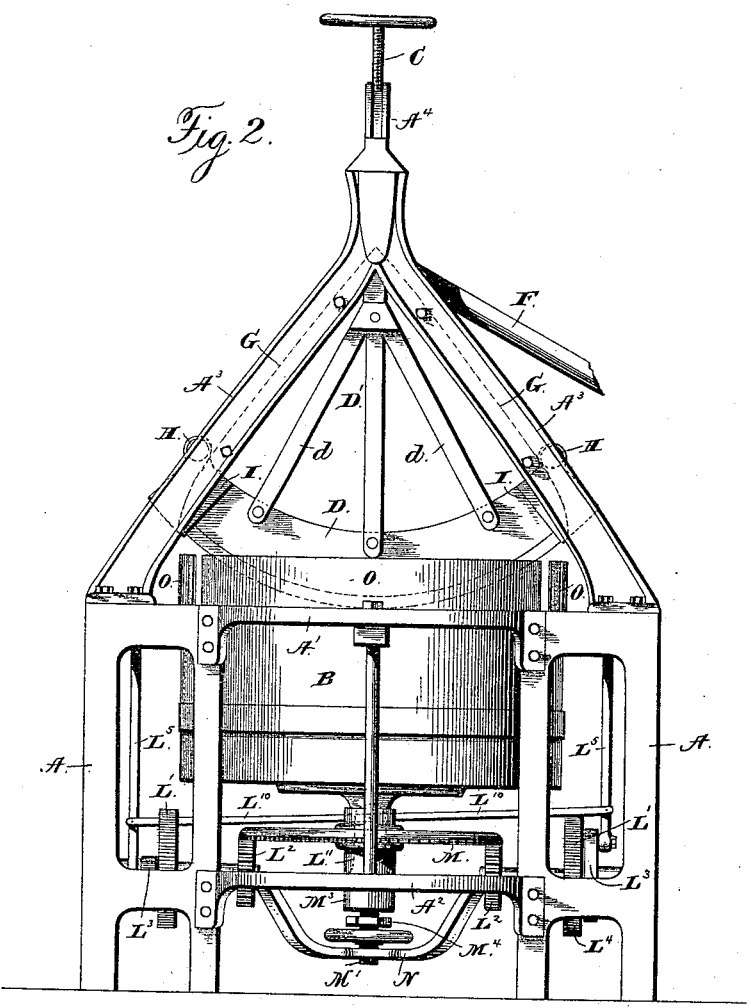
Figure 3:
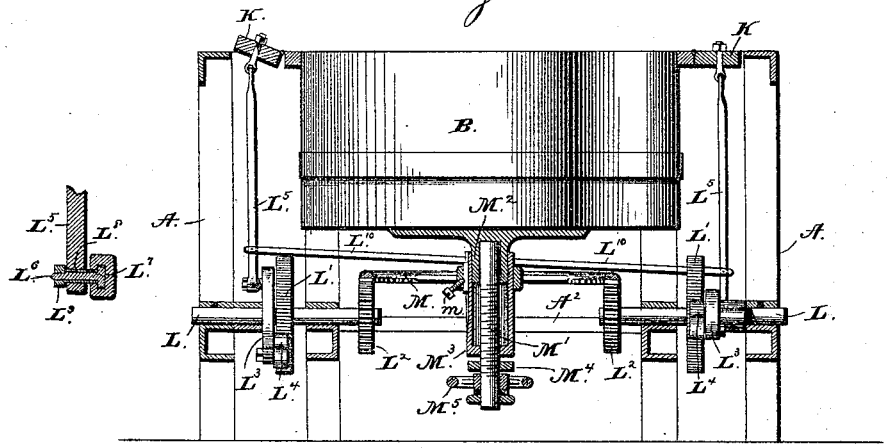
Figure 4:
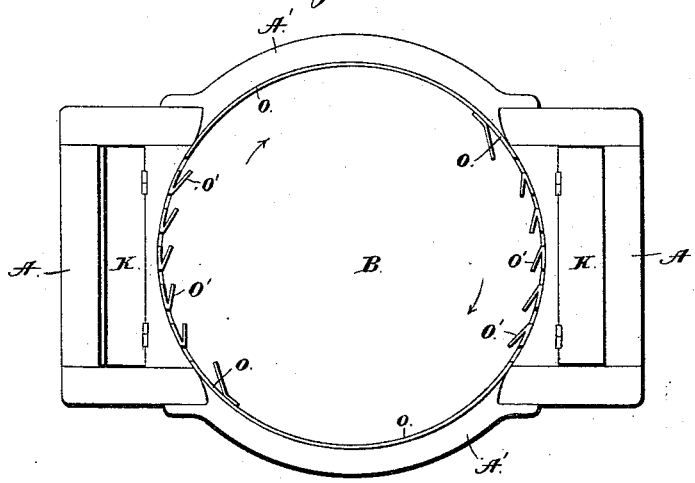

Figure 1 shows a perspective view of our improved sausage-meat cutter; Fig. 2, a view of the same in side elevation; Fig. 3, a vertical sectional view of the support and driving-gear for the rotary block; Fig. 4, a plan view of the apparatus with the rocking cutter removed; Fig. 5, a view of the rocking cutter in front elevation; Fig. 6, a detail view, in side elevation, showing one of the adjustable step-actuating plates on the rocking cutter, and Fig. 7 a detail sectional view showing the manner of connecting the operating pitman-rod with the cutter-frame.

Letters of like name and kind refer to like parts in each of the figures.

The object of our invention is to provide certain improvements in sausage-meat cutters; and to this end our invention consists in the machine and in the parts thereof, constructed, arranged, and combined as hereinafter specified.

The machine, as shown and described in this application, is, like the one covered by the pending United States application, Serial No. 302,636, filed by Joseph M. Briggs, of the rocking-cutter form, adapted to be driven by power or by hand. As in the said other machine, the block upon which the meat is cut is automatically turned a certain distance at the end of each rocking movement of the cutter. Such turning is produced by the weight of the rocking-cutter frame being brought to bear upon a swinging step as the cutter rocks off of the block at either end of its travel. These steps are, as before, connected with swinging pawl-carrying arms, whose pawls engage the teeth of wheels which are connected by suitable gearing with the block, so that the latter will be rotated as the pawls turn their respective toothed wheels; but we use different means for elevating the steps and moving the pawl-arms back to their normal position each time that they have been moved by the cutter-frame.

In the drawings, A designates the main frame of our machine, formed with the central round opening or space in which the cutter-block B is situated and revolves. As shown, this frame consists, essentially, of the two end frames for supporting the means for rotating the block B, and the curved upper and lower bars $A'$ $A^2$, preferably of metal. The upper bars $A'$ are curved to fit closely to the sides of the upper portion of the block, but not so closely as to interfere in any way with the block's rotation. We contemplate, where desired, providing the frame with rollers to engage the periphery of the block at different points, so as to steady the latter as it turns.

Bolted or otherwise attached to the end portions of the frame are the feet of the two parallel upright frames $A^3$ $A^3$, arranged on opposite sides of the rocking cutter, to be described. To the tops of these frames are attached the ends of the bar $A^4$, through the middle portion of which is tapped the screw C, having the head or nut $c$ on its lower end.

A double hook $C'$, having its upper end slotted to embrace the lower portion of the screw and rest upon the nut or head $c$, has in its lower bend or hook a horizontal bar $C^2$, provided with nuts $c'$ $c'$ on its threaded ends.

The curved cutting-blades D D, of which there are six in the machine shown in the drawings, have their edges resting and rocking upon the block B. They are connected together and with the means for rocking them in the following way: For each cutter there is an upright frame $D'$, consisting of the three downwardly-divergent arms $d$ $d$ $d$, connected with a solid portion or plate $d'$ at their upper ends, while their lower ends are adapted to be connected with three separate points on the cutter, such points being situated, respectively, near the opposite ends of the cutter and at the middle point thereof. Extending upward from the tops or plates $d'$ of the two frames $D'$ $D'$ at the middle of the series are the slotted arms $d^2$ $d^2$, in whose slots $d^3$ $d^3$ are the squared portions $d^4$ $d^4$ of a bar $d^5$, which has the cylindrical central part, and at the ends of such part the collars $d^6$ $d^6$ to engage the inner faces of the arms $d^2$ $d^2$. Beyond its squared slot-engaging portions the bar has its ends threaded and provided with nuts $d^7 d^7$ to clamp the arms $d^2 d^2$ against the bar-shoulders. Passing through the lower ends of arms $d\ d\ d$ and suitable openings in the cutter-blades are the bolt-rods $d^8 d^8 d^8$, carrying between the blades the blocks or distance-pieces $d^9 d^9 d^9$. These bolt-rods can be provided with a head on one end and a nut on the other, or with two nuts on its opposite ends to engage the outer faces of the outer cutters. With such construction if the nut or the two nuts, where such are used, be tightened up, the cutter-blades will be clamped against the distance-pieces and rigidly held in place. Each of the inner frames $D' D'$, which carry the slotted arms $d^2 d^2$, is connected with the two frames on its outer side by means of a bolt-rod $d^{10}$, upon which between the frames are the distance-pieces $d^{11} d^{11}$. As in the case of the means used for connecting the upright frames with the cutters and securing the latter in place, the bolt-rod can be a headed one with a nut on its unheaded end, or can have two nuts engaging the inner and outer sides, respectively, of the inner and outer connected frames. With the entire construction described a firm and rigid rocking frame carrying the cutters is secured.

Pivotally connected with the cylindrical central portion of the bar $d^5$ is the end of a pitman F, driven from a wheel F', which can be turned by power or by hand, as desired.

On the inner sides of each of the frames $A^3 A^3$ are the two upwardly-converging guide-ribs G G, curved so as to be parallel with the line of travel of fixed points on the forward and rearward ends, respectively, of the nearest cutter. For engaging and riding along these ribs as the cutters rock, each end of the nearest cutter is provided with a roller H. Such rollers can be journaled directly upon the cutter; or, as we prefer, can instead be supported on the plates I I, secured to the cutter by bolts $i\ i$, passing through slots $i' i'$. These slots run in such direction that upon loosening the bolts the plate can be adjusted up or down on the cutter, so that its lower end will project less or more below the cutter-edge.

Hinged to the end portions of the frame A, on opposite sides of the block B, are the two swinging steps K K, like those shown and described in the pending application referred to hereinbefore. They are so situated that the ends of the cutter-blades extend out over them as the cutter-frame reaches the ends of its rocking motion. Instead, however, of having the cutter-edges themselves strike and rest upon the steps, so as to bear them down, in the present machine we make the lower edges of plates I I engage the steps and depress them slightly in advance of said edges. As the plates are adjustable, the amount of depression of the steps by the weight of the cutters and cutter-frame can be regulated at will without change in the movement of the cutters themselves.

On each of the end portions of the frame A, below the respective steps K, is journaled a shaft L, having fixed upon it a toothed wheel L' and a gear-wheel $L^2$ to mesh with and drive the horizontal gear-wheel M, connected with the block B, as hereinafter described. Pivoted upon each shaft L, close beside wheel L', is a lever $L^3$, which carries upon one end one or more pawls $L^4$ to engage the teeth of said wheel and turn the same as the pawl-carrying lever-arm is swung upward. The other arm of the lever is connected with the lower end of a rod $L^5$, which at its upper end is attached to the respective step K, so as to be actuated thereby.

The form of connection which we prefer is that shown, consisting of a bolt $L^6$, with its head in an undercut longitudinal slot or groove $L^7$ in the lever-arm $L^3$, a sleeve or bushing $L^8$ on the bolt engaging an opening in the end of the rod $L^5$, and a nut $L^9$ to keep the rod end in place on the sleeve. While we prefer this form of connection between each pawl-lever and its respective actuating-rod $L^5$ as allowing adjustment of the throw of the lever, we do not limit ourselves thereto.

Any other desired form of connection may be used without departure from our invention.

Pivotally attached at its opposite ends to the corresponding rods $L^5$ of the two pawl-levers $L^3 L^3$ is the lever $L^{10}$, pivoted upon a standard $L^{11}$ on the machine-frame. By this means as a step K is depressed by the weight of the cutter-frame brought upon it as the cutter rocks in one direction and the lever connected with that step is swung so that its pawl turns its respective wheel L' the other pawl-lever will be swung in the opposite direction, so as to lower its pawl-carrying arm and raise its connected step K into its normal position.

The rotary block B is adjustably supported in order that it may be raised or lowered to bring its upper surface to the desired height with reference to the cutters.

Journaled and supported at its lower end in a spider N, attached to the machine-frame in any desired way, is the lower end of the screw M', whose upper end is tapped into a vertical hub $M^2$ on the under side of the block. Attached to such hub and extending downward therefrom around the screw is the sleeve $M^3$, which, within its lower end, is screw-threaded to engage the screw M'. On the latter below the sleeve is a jam or lock nut $M^4$, to be screwed up against the sleeve end to lock the screw and sleeve together and prevent them from turning with reference to each other. A hand-wheel $M^5$, by which the screw can be turned in the sleeve when the jam-nut is not screwed up, is fixed to the screw near its lower or bearing end.

The gear-wheel M, set forth hereinbefore as meshing with the driving gear-wheels $L^2 L^2$ on shaft L L, is keyed to the sleeve, so that it must rotate therewith, but is capable of longitudinal up and down movement thereon. A set-screw m on the wheel serves to engage the sleeve and fix the wheel thereon at any desired point.

To keep the meat being cut from working off the block B, we provide an upright rim O, attached to the frame and extending around the edge of the block.

Close to the sides of the path of the cutter, toward which the meat on the block is carried by the rotation of the latter, forwardly and inwardly inclined plates O' are attached to the rim, so as to extend therefrom over a portion of the block. That portion of the rim which stands across the path of the cutters is slotted or divided to allow passage of the latter (see Fig. 4) as the cutter-frame rocks.

To each portion of the rim, between the slots or divisions therein, is attached a forwardly and inwardly inclined plate $O^2$, like those already described, adapted to act as a plow or deflector to guide and turn inward toward the center of the block the meat which is brought against it by the block's rotation.

The operation of our machine and its parts is briefly as follows: When the meat to be cut has been placed upon the block B, the cutter-frame is rocked by the pitman-rod F, driven from wheel F', rotated by power or by hand, as desired. The extent of rocking of the frame can be increased or diminished by lowering or raising the bar $d^5$ on the slotted arms $d^2 d^2$, so as to bring it nearer to or farther from the plane of the curved cutter-edges, which rest on the block-top. As the cutter-frame moves in one direction, so that the cutters are rocked off the block, the trip-plates I I on the ends of the outer cutters engage the respective steps and force them down, so as to cause the pawl-carrying lever below to turn its toothed wheel L'. From such wheel, through the intermeshing gears $L^2$ and M, the block will then be given a partial rotation. It will be observed that at the end of its throw the cutter-frame is supported entirely by the plates I I, and not by the cutting-edges bearing on the hinged steps. As the pitman F travels back again, the cutter-frame is rocked toward the other end of the machine, so that the plates I I on the other ends of the cutters engage and force down the other step to cause the pawl-carrying lever connected with that step to rotate the block through the connections and gearing described. As such lever is moved by the step to raise its pawl-carrying end, the other pawl-lever is, through the lever $L^{10}$, swung in opposite direction to lower its pawl-carrying end and raise the connected step K to its normal position again. As the block is turned and the cutter-frame is rocked, the meat which works out toward the edge of the block is turned inward on the latter by the forwardly and inwardly inclined plows or deflectors O' O'. The cutter-frame is steadied and the cutters are kept in place during the movements of the frame by the rollers H H on the plates I I, attached to the outer cutter ends running on the curved guide-ribs G G on the upright frames $A^2 A^2$. The throw of the pawl-levers and so the amount of turning of the block B at the ends of the movement of the cutter-frame can be changed by adjusting the plates I I so that they will project more or less below the plane of the cutter-edges, and will strike the respective hinged steps when the frame is farther from or nearer the ends of its travel. When, on account of wear or for any other reason, it becomes desirable to raise block B, the jam-nut $M^4$ is loosened and the screw M' is turned by hand-wheel $M^5$, so that the sleeve $M^3$ is screwed up the desired distance. The nut is then turned to lock the sleeve and screw together again. When the sleeve is thus raised, the set-screw m is loosened and the wheel M is lowered until properly in mesh with its driving-wheels $L^2 L^2$. The set-screw is then tightened up again to fix the wheel as adjusted. The point of connection of the rods $L^5 L^5$ with the respective pawl-levers $L^3 L^3$ can be changed as desired, to alter the throw of the latter as the steps are depressed a certain distance. With the nuts $L^9 L^9$ loosened the bolts can be slid toward or from the pivotal part of the lever, so as to increase or diminish the amount of movement of the levers by the rods as the latter are moved up and down by the stops K K. Having been properly adjusted, the bolts can be fixed on the lever-arms by simply tightening up the nuts again. When it is desired to raise the cutter-frame clear of the block B, in order that the knives may be taken out, the screw C is turned down, so as to lower the hook C', and the ends of the bar $C^2$, with the nuts removed, are inserted in the slots in arms $d^2 d^2$ on the cutter-frame. The nuts c' c' are then screwed on to hold the arms on the bar, and the screw C is turned to elevate the hook and the cutter-frame with it.

Our machine constructed as shown and described, while automatic and continuous in its action as long as the pitman F is operated, is simple and cheap in construction.

With the means described for preventing the meat from working off the block and for turning it inward toward the block-center, the cutting is found to be most thorough and uniform.

The guiding devices for the rocking-cutter frame serve effectually to steady the frame and hold the cutters in place, so that they always rock in the same vertical planes, passing through the slots in the meat-retaining rim O.

Having thus described our invention, what we claim is—

1. In a sausage-meat cutter, in combination with the curved cutting-blades and the frame for holding them provided with the upright slotted arms, a bar having its ends adjustably fastened in the slots in the arms, and the pitman pivotally connected with the bar, substantially as and for the purpose specified.

2. In a sausage-meat cutter, in combination with the curved cutting-blades and the frame holding them having the two upright arms each provided with a slot, the bar having squared portions to engage the slots and shoulders or collars to engage the inner sides of the arms, nuts on the bar ends, and the actuating-pitman pivoted at one end of the bar, substantially as and for the purpose shown.

3. In a sausage-meat cutter, in combination with the curved cutting-blades, a frame for each blade having the three arms to be attached to different points on the blades, bolts passing through the series of blades and the frame-arms, distance-pieces on the bolts between the blades, arms on the two frames at the center of the series, means for connecting these arms together, a bolt for each one of said inner frames passing through such frame and the other frames on the outer side of it, and distance-pieces on such bolts between the frames, substantially as and for the purpose set forth.

4. In combination with a rocking cutter, a curved guide on a suitable frame, and means carried by the cutter for engaging and riding along such guide as the cutter rocks, substantially as and for the purpose described.

5. In combination with a rocking cutter, two curved guides on a suitable frame, and means on the cutter at opposite ends thereof for engaging the guides as the cutter rocks, substantially as and for the purpose specified.

6. In combination with a rocking cutter and a support upon which the cutter rocks, upwardly-converging curved guides on a suitable stationary frame, and means at or near the opposite ends of the cutter to engage such guides, substantially as and for the purpose shown.

7. In combination with a rocking cutter and the supporting-surface upon which the cutter rocks, upwardly-converging curved guides on a suitable frame, and guide-rollers traveling with opposite ends of the cutter engaging the guides, substantially as and for the purpose set forth.

8. In combination with a rocking cutter having the series of curved blades and the surface upon which such blades rest, upright frames at opposite sides of the cutter, each provided with upwardly-converging curved guides, and guiding devices on the outer cutter-blades for engaging and riding along these guides as the cutter rocks, substantially as and for the purpose described.

9. In combination with a rocking cutter and the support or surface upon which it rocks, two plates on each side of the cutter situated at or near its opposite ends, a roller journaled upon a stud or pin on each plate, and the upwardly-extending curved guides engaged by the rollers, substantially as and for the purpose specified.

10. In combination with the rocking cutter and the surface or support upon which it rocks, plates adjustably attached to the sides of the cutter at or near its ends, rollers pivotally supported on the plates, and the upright frames provided with the curved upwardly-extending guides engaged by the rollers, substantially as and for the purpose shown.

11. In a sausage-meat cutter, in combination with the rocking cutter, the rotary block, the movable pieces at opposite sides of the block for actuating the block-turning devices, and means carried by the cutter for engaging and actuating such movable pieces without contact of the cutter-edges therewith, substantially as and for the purpose set forth.

12. In a sausage-meat cutter, in combination with the rocking cutter and the rotary block, movable pieces at opposite sides of the block for actuating the block-turning devices, and plates attached to the cutter for engaging and actuating the movable pieces at opposite ends of the cutter's throw, substantially as and for the purpose described.

13. In a sausage-meat cutter, in combination with the rocking cutter and the rotary block, movable pieces for actuating the block-turning devices situated at opposite sides of the block, and adjustable plates on the cutter to engage and actuate the movable pieces at the ends of the throw of the cutter, substantially as and for the purpose specified.

14. In a sausage-meat cutter, in combination with the rocking cutter provided on its opposite ends with the slotted plates held by bolts, and the rotary block, movable pieces for actuating the block-turning devices, situated in the path of the lower ends of the plates on the cutters, substantially as and for the purpose shown.

15. In a sausage-meat cutter, in combination with the rocking cutter and the rotary block, a hinged step for actuating devices for turning the block, and the step-engaging bearing-pieces on the cutter adapted to move the step as the cutter rocks off the block, substantially as and for the purpose set forth.

16. In a sausage-meat cutter, in combination with the rocking cutter and the rotary block, the hinged steps for actuating the block-turning devices, situated at opposite sides of the block, and bearing-pieces on the opposite ends of the cutter having their lower ends standing below the plane of the cutter edge or edges, so as to engage the steps as the cutter rocks off the rotary block, substantially as and for the purpose described.

17. In a sausage-meat cutter, in combination with the rotary block and a movable step, a rod connected with the step, a lever provided with a pawl, a toothed wheel engaged by the pawl, a suitable connection between the rod and the lever, adapted to be adjusted toward or from the lever-pivot, and connecting-gearing between the toothed wheel and the block, substantially as and for the purpose specified.

18. In a sausage-meat cutter, in combination with the rotary block and a movable step at one side thereof, the pawl-carrying lever having the slotted arm, the bolt, the sleeve on the latter, the nut on the bolt end, the rod connected at one end with the step and at the other engaging the sleeve on the bolt, a toothed wheel engaged by the pawl on the lever, and connecting-gearing between the wheel and the rotary block, substantially as and for the purpose shown.

19. In a sausage-meat cutter, in combination with the rotary block and the movable steps on opposite sides thereof, the two levers, each connected with one of the steps, a lever connected at opposite ends with such levers, so that as one of them is depressed by the downward movement of its step the other will be moved to raise its step, and suitable means to transmit such motion to said rotary block, substantially as and for the purpose set forth.

20. In a sausage-meat cutter, in combination with the rotary block, the movable steps on opposite sides thereof, the two levers, each connected with one of the steps so as to move therewith, pawls on the levers, toothed wheels engaged by the pawls, gearing connecting such wheels with the rotary block, and a lever connected at opposite ends with the pawl-levers, so as to cause them to move in opposite directions, substantially as and for the purpose described.

21. In a sausage-meat cutter, in combination with the rotary block, the upright screw journaled and supported in a suitable bearing, the sleeve rigidly connected with the block and provided with internal threads to engage those of the screw, and a jam-nut on the latter, substantially as and for the purpose specified.

22. In a sausage-meat cutter, in combination with the rotary block, the upright screw journaled and supported in a suitable bearing, a hub on the block, a sleeve attached to such hub and provided with screw-threads to engage the screw, the jam-nut on the screw, and means for turning the latter, substantially as and for the purpose shown.

23. In combination with the rotary block and the screw journaled and supported in suitable bearings, the sleeve provided internally with threads to engage the screw and at its upper end rigidly connected with the block, the jam-nut on the screw, the gear-wheel on the sleeve, connections between the sleeve and wheel, whereby the latter is caused to rotate with the former, but is capable of longitudinal movement thereon, and a set-screw on the wheel to engage the sleeve, substantially as and for the purpose set forth.

24. In a sausage-meat cutter, in combination with the rotary block upon which the meat is cut, a stationary rim around the edge of the block, and one or more stationary plates, each extending over a portion of the block and inclined inward and forward with reference to the direction of rotation of the block, substantially as and for the purpose described.

25. In a sausage-meat cutter, in combination with the rotary block upon which the meat is cut, a stationary rim around the edge of the block, and stationary plates attached to said rim extending over the block at an inward and forward inclination with reference to the direction of rotation of the block, substantially as and for the purpose specified.

26. In a sausage-meat cutter, in combination with the rotary block and the rocking cutter thereon having several cutting-blades, stationary inclined plates between the paths of the cutters adapted to turn the meat near the edge of the block inward away from such edge as the block revolves, substantially as and for the purpose set forth.

27. In a sausage-meat cutter, in combination with the rotary block and the cutter thereon having several cutting-blades, the stationary rim around the edge of the block slotted to admit the passage of the cutter-blades, and the inwardly and forwardly inclined stationary plates attached to the rim between the slots therein, substantially as and for the purpose described.

28. In a sausage-meat cutter, the means for raising the cutter from the cutting block or surface, which consists of a screw on a support above the frame, a hook connected with the screw, so that the latter is free to turn without rotation of the hook, a bar engaged by the hook having threaded end portions, and nuts on the latter, substantially as and for the purpose specified.

29. In a sausage-meat cutter, the means for raising the cutter-frame from the cutter block or surface, which consists of a screw on a support above the frame, a head or collar on the lower end of the screw, the double hook with its upper end slotted, the bar in the lower end of the hook having threaded end portions, and nuts on the latter, substantially as and for the purpose shown.

In testimony that we claim the foregoing we have hereunto set our hands this 31st day of March, 1890.

JOSEPH M. BRIGGS.
ALBERT F. SCHWAHN.

Witnesses:
W. H. TRAWLEY,
J. C. GORES.